United States Patent [19]

Goodall et al.

[11] 4,393,182
[45] Jul. 12, 1983

[54] OLEFIN POLYMERIZATION PROCESS WITH NOVEL SUPPORTED TITANIUM CATALYST COMPOSITIONS

[75] Inventors: Brian L. Goodall; Adrianus A. van der Nat; Willem Sjardijn, all of Amsterdam, Netherlands

[73] Assignee: Shell Oil Company, Houston, Tex.

[21] Appl. No.: 318,649

[22] Filed: Nov. 5, 1981

Related U.S. Application Data

[63] Continuation-in-part of Ser. No. 143,578, Apr. 25, 1980, Pat. No. 4,329,253.

[30] Foreign Application Priority Data

May 17, 1979 [GB] United Kingdom ................ 7917240

[51] Int. Cl.$^3$ ........................... C08F 4/02; C08F 10/00
[52] U.S. Cl. .................................... 526/125; 526/124; 526/127; 526/142; 526/144; 526/351
[58] Field of Search ............... 526/124, 125, 142, 151, 526/144

[56] References Cited

U.S. PATENT DOCUMENTS

| | | | |
|---|---|---|---|
| 3,094,568 | 6/1963 | Hay et al. | 252/429 B X |
| 4,069,169 | 1/1978 | Toyota et al. | 526/125 |
| 4,107,415 | 8/1978 | Giannini et al. | 526/114 |
| 4,115,319 | 9/1978 | Scata et al. | 526/125 |
| 4,136,243 | 1/1979 | Appleyard et al. | 526/139 |
| 4,146,502 | 3/1979 | Yokoyama et al. | 252/429 B |
| 4,151,112 | 4/1979 | Wristers | 252/429 B |
| 4,159,256 | 6/1979 | Sakurai et al. | 526/128 |
| 4,182,691 | 1/1980 | Ueno et al. | 252/429 B |
| 4,210,738 | 7/1980 | Hermans et al. | 252/429 B X |
| 4,220,554 | 9/1980 | Scata et al. | 252/429 B |
| 4,224,183 | 9/1980 | Staiger | 252/429 B |
| 4,235,984 | 11/1980 | Shiga et al. | 252/429 B X |
| 4,239,650 | 12/1980 | Franke et al. | 252/429 B |
| 4,242,229 | 12/1980 | Fujii et al. | 252/429 B |
| 4,242,230 | 12/1980 | Ueno et al. | 526/125 |
| 4,252,929 | 2/1981 | Kuroda et al. | 526/114 |
| 4,321,345 | 3/1982 | Sato et al. | 526/125 |

FOREIGN PATENT DOCUMENTS

| | | |
|---|---|---|
| 4790 | 10/1979 | European Pat. Off. |
| 7094 | 1/1980 | European Pat. Off. |
| 2644440 | 4/1977 | Fed. Rep. of Germany |
| 2912895 | 10/1979 | Fed. Rep. of Germany |
| 1554340 | of 0000 | United Kingdom |

*Primary Examiner*—Edward J. Smith

[57] ABSTRACT

An olefin polymerization process comprises contacting the monomer to be polymerized with a catalyst composition comprising: an organoaluminum compound, a first electron donor, and a product obtained by contacting a solid component comprising a magnesium halide in which the atomic ratio of chlorine to magnesium is at least 1.2, a titanium halide and a second electron donor, with a halohydrocarbon and thereafter with a tetravalent titanium compound.

21 Claims, No Drawings

OLEFIN POLYMERIZATION PROCESS WITH NOVEL SUPPORTED TITANIUM CATALYST COMPOSITIONS

This application is a continuation-in-part of U.S. Ser. No. 143,578, filed April 25, 1980, now U.S. Pat. No. 4,329,253.

The present invention relates to a process for the polymerization of olefins using novel solid catalyst components comprising a magnesium halide and a titanium halide. The novel catalyst components and catalysts and methods for their preparation are claimed in said U.S. Pat. No. 4,329,253.

Numerous proposals are known from the prior art to provide olefin polymerization catalysts obtained by combining a constituent comprising a magnesium halide and a titanium halide with an activating organoaluminum compound. The polymerization activity and the stereospecific performance of such compositions may be improved by incorporating an electron donor (Lewis base) into the constituent comprising titanium, into the organoaluminum activating constituent or into both these constituents. The catalyst compositions of this type which have been disclosed in the prior art are able to produce olefin polymers in high yield, calculated as g polymer/g titanium, and also with the required high level of stereoregular polymeric material. However, this advantage is normally achieved at the detriment of polymer yield, calculated as g polymer/g aluminum. The high polymerization activities of the relevant catalyst compositions known from the prior art are only obtained when employing large amounts of activating organoaluminum compounds, e.g., amounts, defined in the atomic ratio of aluminum to titanium, in most cases 100:1 or more. In addition to this, many of the proposed catalyst compositions have the disadvantage that an adequate control of the molecular weight by polymerizing in the presence of hydrogen can not be achieved without impairing the stereospecific performance of the catalyst compositions. Still further increase in activity of the catalysts is desirable since this will result in reduced ash contents in polymers produced without deashing or extraction steps in the process.

The catalysts employed according to the present invention generally have increased polymerization activities, even at lower aluminum to titanium ratios, and also have an attractive stereospecific performance. Under appropriate conditions of catalyst preparation and polymerization, when applied to propylene polymerization, the process of this invention, without catalyst deactivation or extraction of atactic polymer, is capable of producing polymers having very low catalyst residues and the high isotacticity required in commercially useful polypropylene.

The catalyst compositions employed according to this invention comprise a solid, titanium-containing catalyst constituent obtained by contacting a solid component comprising a magnesium halide in which the atomic ratio of halogen to magnesium is at least 1.2, an electron donor and a titanium halide, successively with a halohydrocarbon and with a tetravalent titanium compound.

In the most preferred titanium-containing catalyst constituents, the solid magnesium halide-containing component which is contacted with the halohydrocarbon and with the tetravalent titanium compound comprises a magnesium dihalide.

Catalysts in accordance with this invention comprise such solid titanium-containing catalyst constituents in combination with an organoaluminum compound and an electron donor or with an at least partial reaction product of an organoaluminum compound and an electron donor.

For convenience of reference, the solid titanium-containing catalyst constituent may be referred to herein as "procatalyst," the organoaluminum compound or its at least partial product with an electron donor as "cocatalyst", and the electron donor compound which is used separately or partially or totally complexed with the organoaluminum compound as component of the total catalyst, as "selectivity control agent" (SCA). The cocatalyst and selectivity control agent are suitably such as are known for use with catalysts of the type of titanium halide supported on magnesium halide.

Since electron donor compounds are used both in the preparation of the procatalyst and of the total catalyst and since different electron donor compounds may be used for these purposes in production of a given catalyst, we may refer to the electron donor compound employed in preparation of the procatalyst as "electron donor" and that employed either complexed with the organoaluminum cocatalysts or separately as selectivity control agent.

The solid magnesium halide-containing components used in the preparation of the procatalysts may be prepared by reacting the electron donor with a titanium halide and with a magnesium halide, in any order, including reactions wherein the magnesium halide is produced in situ, e.g., by converting another magnesium compound with a halogenating agent such as hydrogen chloride or an excess of titanium tetrahalide, into a magnesium dihalide. The magnesium halide-containing component preferably comprises a halide of tetravalent titanium but may also comprise varying amounts of a titanium trihalide. The latter situation may arise when the magnesium halide is prepared by converting a dialkyl magnesium compound, an alkyl magnesium halide or an alkyl magnesium alkoxide into the magnesium dihalide by reacting with a titanium tetrahalide. The formation of the magnesium dihalide then proceeds under simultaneous reduction of titanium tetrahalide to titanium trihalide, and dependent upon the molar amount of tetrahalide employed this reduction may be complete or only partial. Subsequent to such conversion, the electron donor may then be incorporated into the reaction product to produce the desired solid component which is contacted with the halohydrocarbon and with the tetravalent titanium compound. Alternatively, the conversion of the magnesium compound may be effected in the presence of an electron donor.

Suitable methods for preparing the magnesium halide include for example:

halogenation of a magnesium dialkoxide or diaryloxide, such as magnesium diethoxide or diphenoxide, by reacting with titanium tetrahalide or another relatively strong halogenating agent, such as silicon tetrachloride or a di- or tri-chloroalkyl silane;

chlorination of magnesium powder with gaseous chlorine, or hydrogen chloride;

halogenation of a dialkyl magnesium compound, such as diethyl magnesium, with hydrogen chloride;

comminuting a commercial magnesium dihalide, e.g., by milling or grinding, optionally in the presence of an electron donor and/or titanium tetrahalide, to reduce the particle size of the commercial product;

halogenation of a dialkyl or diaryl magnesium compound or an alkyl or aryl magnesium halide or an aryl or alkyl magnesium alkoxide with a halogenating agent such as a titanium tetrahalide, silicon tetrahalide, di- or tri-chloro(alkyl)silane, alkylaluminum halide or carbon tetrachloride;

halogenation of magnesium acetyl acetonate, magnesium oxide, magnesium carbonate, or a magnesium carboxylate with titanium tetrahalide or another convenient halogenating agent such as chlorosilanes or silicon tetrachloride.

In the case of halogenation of magnesium dialkoxides and diarlyoxides, halogenation with halohydrocarbons, e.g., carbon tetrachloride, cannot be employed to produce magnesium dihalides since such agents are not strong enough to effect any noticeable halogenating action. Instead, these agents should be considered substantially chemically inert towards magnesium dialkoxides and diaryloxides.

The halogenation reactions to convert magnesium compounds may be effected in the presence of an electron donor or the electron donor may be added after the halogenation has been carried out. When halogenation of the magnesium compound is effected with a titanium tetrahalide, the solid component so formed will normally contain the desired amount of titanium halide and there is no need to introduce further amounts of titanium halide into the solid component before the latter is subjected to the following treatments with halohydrocarbon and the tetravalent titanium compound. The preferred halogen atom in both the magnesium halide and the titanium halide is chlorine.

Preferred solid magnesium halide-containing components are those obtained by reacting a magnesium dihalide with a titanium tetrahalide and with an electron donor, or by reacting a magnesium dialkoxide or diaryloxide with a titanium tetrahalide and with an electron donor, or by reacting a dialkyl magnesium compound with a titanium tetrahalide and with an electron donor. Especially preferred are those in which the halides are chlorides.

The molar ratio of electron donor to magnesium in the solid component as well as in the finished procatalyst is in the range from 0.01 to 10, e.g., from 0.05 to 10 and from 0.1 to 5.0, and especially from 0.01 to 1.0. The atomic ratio of titanium to magnesium in the solid component is preferably from 0.005 to 4.0, particularly from 0.02 to 1.5, and the atomic ratio of halogen to magnesium in the magnesium halide is preferably at least 1.5.

Preferred magnesium halide-containing solid components can therefore be represented by the general formulae (which are considered equivalent in the context of this invention):

$MgX_n \cdot mD \cdot q(TiX_p)$ or

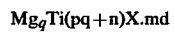

$Mg_qTi(pq+n)X \cdot md$ in which

X is halogen, preferably chlorine, D is an electron donor;

n is at least 1.2, preferably at least 1.5;

m is a number from 0.01 to 10, suitably from 0.05 to 10, and preferably from 0.01 to 1.0;

p is a number of from 3 to 4, preferably 4; and q is a number of from 0.005 to 4.0, suitably from 0.02 to 1.5, and preferably from 0.03 to 0.2.

Another group of preferred solid components can be represented by the same general formulae, but wherein at least 70% of groups X represent halogen and the remaining groups X represent aryl oxide or alkoxide groups.

Suitable electron donors which are used in combination with or reacted with an organoaluminum compound as selectivity control agents and which are also used in the preparation of the solid catalyst constituents are ethers, esters, ketones, phenols, amines, amides, imines, nitriles, phosphines, phosphites, stibines, arsines, phosphoramides and alcoholates.

Examples of suitable electron donors are those referred to in British Patent Specification No. 1,486,194 or its equivalent U.S. Pat. No. 4,136,243 and German Offenlegungsschrift No. 2,729,126 or its equivalent British Patent Specification No. 1,554,340. Preferred electron donors are esters and diamines, particularly esters of aromatic carboxylic acids, such as ethyl and methyl benzoate, p-methoxy ethylbenzoate, p-ethoxy methyl benzoate, ethyl acrylate, methyl methacrylate, ethyl acetate, dimethyl carbonate, dimethyl adipate, dihexyl fumarate, dibutyl maleate, ethyl-isopropyl oxalate, ethyl p-chlorobenzoate, p-amino hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,3,4,5-tetraethyl piperidine and similar compounds.

Such electron donors may be used as selectivity control agent in the catalyst in combination with, or as an at least partial reaction product with, the organoaluminum cocatalyst as well as in preparation of the procatalyst. The electron donor used in one of the catalyst constituents may be the same as or different from the electron donor in the other one. Preferred electron donors for use in preparing the titanium constituent are ethyl benzoate and p-methyl toluate. Preferred as selectivity control agent in the total catalyst is ethyl anisate (p-methoxy ethyl benzoate).

The organoaluminum compound of the cocatalyst may be chosen from any of the known activators in catalyst systems comprising titanium halides supported on magnesium chloride. It is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent employed separately, in combination with, or reacted with, an organoaluminum compound, calculated as mol per mol of aluminum compound, are in the range of from 0.1 to 1.5, particularly from 0.2 to 0.8.

The contacting of the solid component comprising a magnesium halide, a titanium halide and an electron donor, with halohydrocarbon and with the tetravalent titanium compound may be effected simultaneously or, preferably, by first contacting with halohydrocarbons and then with the tetravalent titanium compound. Inert hydrocarbon diluents may be present during each of these contacting stages but it is preferred to carry out these stages with undiluted reactants. Temperatures employed during contacting may range from room temperature to the boiling point of the contacting agents. The time period of the contacting is not very critical, one may employ relatively short periods of, say, twenty minutes but also periods of several hours, preferably not more than 4 hours. The amount of halohydrocarbon to be employed will usually be chosen to produce slurry concentrations of from 5 to 150 g solid per l, preferably from 10–100 g/l.

Preferred aliphatic halohydrocarbons are halogen-substituted hydrocarbons with 1 to 12, particularly less than 9, carbon atoms per molecule, comprising at least two halogen atoms, such as dibromoethane, trichloromethane, 1,2-dichlorethane, 1,1,3-trichloroethane, dichlorobutanes, trichlorocyclohexanes, trichlorofluorooctanes and dibromofluorodecanes. Carbon tetrachloride is a preferred aliphatic halohydrocarbon. Aromatic halohydrocarbons may also be employed, e.g., chlorobenzene, dichlorobenzene or other multiple-halogen substituted benzene, chlorotoluene and multiple-halogen substituted toluenes or xylenes. Chlorobenzene and dichlorobenzene are preferred aromatic halohydrocarbons.

The contacting may effect an increase of the halogen content of the magnesium halide contained in the solid component, but this is by no means essential. Neither is it essential that the contacting with halohydrocarbon results in an incorporation of this halohydrocarbon into the catalyst constituent. To the contrary, it is preferred to remove any halohydrocarbon that remains in the catalyst constituent in any form, e.g., as physically absorbed material, by washing with an inert aliphatic or aromatic hydrocarbon diluent. In this respect the contacting with halohydrocarbon should be considered an extraction treatment rather than a chemical reaction.

The treatment of the solid component with the tetravalent titanium compound, preferably a halide of tetravalent titanium and most preferably $TiCl_4$, serves to increase the titanium tetrahalide content of the solid procatalyst. The final atomic ratio of tetravalent titanium to magnesium in this catalyst constituent should be in the range from 0.005 to 3.0, particularly of from 0.02 to 1.0. For this purpose, the contacting with the halide of tetravalent titanium is most suitably carried out at a temperature of from 40° to 136° C. during 0.1–6 hours. Particularly preferred contacting temperatures are those from 60° to 130° C. and the most preferred contacting periods are in between 0.5 to 3.5 hours. The treatment may be carried out in successive contacts of the solid with separate portions of the titanium compound.

Suitable halides of tetravalent titanium are, for example, dialkoxytitanium dihalides, diaryloxytitanium dihalides, alkoxytitanium trihalides, aryloxytitanium trihalides, titanium tetraalkoxides and preferably titanium tetrahalides.

The preferred halogen atom in the magnesium halide and in each of the titanium compounds is chlorine.

After the treatment with the tetravalent titanium compound the catalyst constituent should be washed to remove absorbed, unreacted titanium compound. The titanium content of the final, washed catalyst constituent is suitably in the range from about 1.5 to about 4.6 percent by weight.

To prepare the final polymerization catalyst composition, procatalyst, cocatalyst and selectivity control agent if used separately, may be simply combined, suitably employing a molar ratio to produce in the final catalyst an atomic ratio of aluminum to titanium of from 1 to 150, and most suitably from about 10 to about 150.

The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

The present invention is directed to a process for polymerizing alpha-monoolefins employing the novel catalyst constituents and compositions. The process of this invention comprises homo- or copolymerization of alpha-monoolefins, particularly olefins of three to eight carbon atoms per molecule, to predominantly isotactic polymer products. The process is particularly useful in the polymerization of propylene to isotactic polypropylene homopolymer or in copolymerization of propylene with other monoolefins, particularly with ethylene, for the production of modified polymers such as random copolymers or impact-improved copolymers produced by sequential polymerization with different feed compositions. Olefin polymerizations of this invention may be carried out by any of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst composition. Polymerization may be effected batchwise or continuously, with constant or intermittent supply of the catalyst or of the catalyst constituents to the polymerization reactor. The activity of the novel catalyst compositions is so pronounced that there is no need for any catalyst removal or polymer extraction techniques. Total inorganic residues in the polymer, i.e., the combined aluminum, chlorine, and titanium content, can be as low as 200 ppm, even less than 100 ppm, as will be shown in the Examples.

While one of the advantages of this invention is that the Al:Ti ratio may be very low, compared to those employed with previously known magnesium chloride-supported titanium chloride procatalysts, and hence the aluminum residue in the unextracted total polymer may be kept very low, it is not necessary to employ such low Al:Ti ratios. The process may also be operated at Al:Ti ratios of 100:1 or higher, generally at some gain in catalyst activity.

Due to their high activity, the catalysts of this invention are used in very small amounts. Like other catalysts of the same type, these catalysts tend to be deactivated by certain impurities, such as water, CO, $CO_2$ and certain sulfur compounds. It is therefore necessary if the advantage of high activity is to be maintained, to keep such impurities to extremely low levels in the reactor feed and in any components which contact the catalyst or are part of the reaction mixture.

In the following Examples the polymerization activity of the various catalyst systems was determined by the following standard polymerization test:

Triethylaluminum (Act) and p-methoxy ethylbenzoate (ED) were mixed in varying amounts during 5 minutes at room temperature in 40 ml iso-octane and introduced into a 1 l autoclave containing 364 g liquid propylene and hydrogen (partial hydrogen pressure 98 kPa). Immediately thereafter the solid catalyst constituent was introduced into the reactor, in the form of a suspension in 20 ml iso-octane. The autoclave was then heated to 60° C. in 5 minutes and the polymerization was continued at that temperature and a total pressure of 2650 kPa, while stirring the contents of the reactor.

After polymerization, remaining unconverted liquid polypropylene was removed by depressurizing and the polymer was analyzed to determine the contents of amorphous material (xylene solubles—XS)—i.e., the percentage of material remaining soluble when cooling a solution of polymer in xylene from its boiling point to room temperature—and the contents of Ti, Al and Cl in the polymer. No intermediate treatments to deactivate the catalyst or to purify the polymer by extraction were employed.

In the Tables given below the Al/Ti molar ratio in the catalyst systems is expressed as a ratio of x:1, x having the values shown.

EXAMPLE 1

22.1 g anhydrous $MgCl_2$ (232 mmol.) and 11.7 g ethyl benzoate (78 mmol.) were milled together in a ball mill, at ambient temperature, under a $N_2$ atmosphere, during three days. 25 g of the resulting product were suspended in 218 ml liquid $TiCl_4$ (2000 mmol.) at 80° C. and stirred during 2 hours. The solid formed was isolated by filtration at 80° C. and washed 5 times with iso-octane at 70° C. 26.1 g of a solid (constituent A) were formed which comprised 0.9%w of Ti, calculated as metal on the total weight of the solid. Chemical analysis of this solid showed that its composition corresponds with the formula $MgCl_2.0.026\ TiCl_4.0.157\ EB$, wherein EB stands for ethyl benzoate.

0.5 g of (constituent A) was suspended in 25 ml carbon tetrachloride (260 mmol.) at 70° C. for 1.5 hours under stirring. The liquid phase was removed by decantation and the white powderous solid formed (constituent B) was washed five times with iso-octane at 70° C.

This constituent B was suspended in 25 ml liquid $TiCl_4$ (227 mmol.) at 80° C. and stirred during 1 hour at that temperature. After isolating the solid by decantation a pale yellow proderous product was obtained which was washed five times with iso-octane at 70° C. The yellow product (constituent C) has a Ti content of 1.8%w.

EXAMPLE 2

10 g magnesium turnings (412 mat) were reacted at room temperature with ethanol employing a mixture comprising 100 ml ethanol, 20 ml xylene, 5 mg of mercurichloride (0.02 mmol.) and 3 mg iodine (0.02 mmol.). The reaction took 5 hours for completion. Subsequently, the liquid phase was removed by distillation and the resulting solid was dried under a nitrogen vacuum in the complete absence of moisture.

50 mmol. of the magnesium diethoxide so obtained were suspended in a mixture of 75 ml toluene and 16.7 mmol. ethyl benzoate. Then 75 ml liquid $TiCl_4$ (681 mmol.) were added and the mixture was stirred at 80° C. during 2 hours. After filtration and washng five times with iso-octane at 70° C., there resulted a pale yellow solid comprising 3.4%w of Ti (constituent D).

0.5 g of constituent D was suspended in 25 ml carbon tetrachloride (260 mmol.) at 70° C. and the suspension was stirred during 1.5 hours. The liquid phase was removed by decantation and the remaining white powderous solid was washed five times with iso-octane at 70° C. and then stirred in 25 ml liquid $TiCl_4$ (227 mmol.) at 80° C. during 2 hours. The product that had been treated with $TiCl_4$ was also washed in an identical manner after removal of the liquid phase by decantation. There resulted a pale yellow solid (constituent E) comprising 4.4%w Ti.

EXAMPLE 3

Example 2 was repeated, now employing 50 mmol. of a commercial grade magnesium diethoxide, which is available in a pelletized form, instead of the magnesium diethoxide prepared from magnesium turnings. All other conditions for the preparation of the final product (constituent F) were identical to those described in Example 2. The amount of titanium in this product was 3.9%w.

EXAMPLE 4

In order to see whether magnesium diethoxide can be halogenated by reaction with carbon tetrachloride, 10 mmol. magnesium diethoxide were suspended in a mixture of 15 ml carbon tetrachloride (155 mmol.) and 3.3 mmol. ethyl benzoate and the suspension was stirred at 75° C. for 2 hours. After washing five times with iso-octane, there resulted a white solid comprising only 0.23%w of Cl, thus showing that only a negligible halogenation had taken place. Hence, this example serves for comparison only.

Table I shows the results obtained by testing the solid constituents A to F in the standard polymerization test.

TABLE I

| Solid constituent | | A* | B* | C | C | D* | E | E | F | F |
|---|---|---|---|---|---|---|---|---|---|---|
| Solid constituent | mg | 42 | 17 | 12 | 24 | 9 | 14 | 7 | 14 | 5 |
| Act. | mmol. | 0.3 | 0.6 | 0.6 | 0.3 | 0.3 | 0.3 | 0.3 | 0.3 | 0.3 |
| ED | mmol. | 0.09 | 0.17 | 0.17 | 0.09 | 0.09 | 0.09 | 0.09 | 0.09 | 0.09 |
| Al/Ti | x | 38 | — | 125 | 30 | 47 | 24 | 48 | 25 | 79 |
| Time | hrs | 0.7 | 3 | 3.0 | 0.25 | 0.7 | 1.3 | 2.1 | 0.2 | 1.5 |
| Yield | kg/g cat. | 1.2 | 0.3 | 15.0 | 9.0 | 0.7 | 12.0 | 18.0 | 7.1 | 20.7 |
| Yield | kg/g cat./h | 1.7 | — | 5.0 | 36.0 | 1.0 | 9.2 | 8.6 | 35.5 | 13.8 |
| Yield | kg/g Ti | 135 | — | 815 | 500 | 19.5 | 270 | 407 | 183 | 530 |
| Yield | kg/g Ti/h | 193 | — | 272 | 2000 | 28 | 208 | 194 | 915 | 353 |
| XS | % w | 4.9 | — | 8.1 | 5.4 | — | 7.5 | 6.4 | 5.4 | 6.5 |
| Ti | ppm | 6 | — | 2 | 2 | — | 3 | 3 | 5 | 2 |
| Al | ppm | 190 | — | 141 | 33 | — | 38 | 60 | 75 | 77 |
| Cl | ppm | 250 | — | 47 | 56 | — | 45 | 30 | 83 | 38 |

*for comparison

EXAMPLE 5

0.8 g n-butyl-ethyl magnesium (7.4 mmol.) dissolved in 12.3 ml n-heptane was mixed with 25 ml iso-octane. The mixture was cooled to −40° C. and at that temperature a solution of 105 mg ethylbenzoate (0.7 mmol.) in 12 ml iso-octane was added, followed by addition of 8 ml liquid TiCl4 (72.8 mmol.). The mixture was slowly heated to 70° C. during a period of 30 minutes and kept at that temperature for 10 minutes. The solid formed was isolated from the liquid phase by decantation and washed three times with iso-octane at 25° C.

Thereafter, 0.9 g of the solid was suspended in 30 ml carbon tetrachloride and stirred for 1.5 hours at 70° C. After decantation the solid was washed 2 times with iso-octane.

Subsequently, the washed solid was suspended in 25 ml liquid TiCl4 (227 mmol.) and the suspension was stirred at 110° C. for 2 hours. The solid was isolated by decantation and washed 6 times with iso-octane at 70° C. (constituent G). This component contains 3.1%w of Ti.

EXAMPLE 6

10.9 g n-butyl-ethyl magnesium (100 mmol.), dissolved in a mixture of 50 ml dibutyl ether (300 mmol.) and 100 ml toluene and 150 ml n-heptane, were combined at 60° C. with a mixture of 100 mmol. ethyl alcohol, 150 ml toluene and 150 ml liquid TiCl4 (1360 mmol.) and the reaction mixture was kept at 90° C. for 1 hour. The solid precipitate formed was isolated by the decantation and washed six times with iso-octane at 25° C. (constituent H).

The Ti-content in this solid is 15.3%w. Chemical analysis of the solid showed that its composition corresponds with the formula $MgCl_2.0.919\ TiCl_{3.22}.0.215\ DBE$, wherein DBE represents dibutyl ether.

2.5 g of this component were reacted with 105 mg ethyl benzoate (0.7 mmol.) and with 25 ml carbon tetrachloride (260 mmol.) at 70° C. during 1 hour. After decanting the liquid phase the solid was washed two times with iso-octane at 25° C. Thereafter the solid was suspended in 25 ml liquid TiCl4 (227 mmol.) at 125° C. during 2 hours. Then the final product was isolated by decantation and washed six times with iso-octane at 70° C. This product (constituent I) contained 3.1%w of Ti.

EXAMPLE 7

4 g of constituent H, prepared as indicated in Example 6, were milled together with 280 mg aluminum trichloride (2 mmol.) and with 300 mg ethyl benzoate (2 mmol.) at ambient temperature, under a $N_2$ atmosphere, during 16 hours. Upon analysis the resulting product appeared to correspond with the formula $MgCl_2.0.9\ TiCl_{3.19}.0.13\ AlCl_3.0.174\ DBE.0.324\ EB$, wherein DBE stands for dibutyl ether and EB for ethyl benzoate.

3 g of the ground reaction product were then treated with 25 ml carbon tetrachloride and then with 25 ml TiCl4 repeating all conditions of Example 6. The final product (constituent J) has a Ti content of 4.6%w.

TABLE II

| Solid constituent | | G | G | I | J | J | J |
|---|---|---|---|---|---|---|---|
| Solid constituent | mg | 20 | 10 | 22 | 20 | 20 | 15 |
| Act | mmol. | 0.6 | 0.3 | 0.6 | 0.6 | 0.3 | 0.45 |
| ED | mmol. | 0.17 | 0.085 | 0.17 | 0.17 | 0.085 | 0.13 |
| Al/Ti | x | 45 | 45 | 40 | 31 | 15 | 31 |
| Time | hrs | 0.2 | 2.8 | 1 | 0.66 | 3 | 2 |
| Yield | kg/g cat. | 5.1 | 8.1 | 6.4 | 11.3 | 6.1 | 15.4 |
| Yield | kg/g cat./h | 25.5 | 2.9 | 6.4 | 17.0 | 2.0 | 7.7 |
| Yield | kg/g Ti | 162 | 270 | 205 | 245 | 133 | 251 |
| Yield | kg/g Ti/h | 810 | 96 | 205 | 371 | 44 | 126 |
| XS | % w | 12.6 | 11.5 | 9.5 | 11.8 | 13.4 | 13.1 |

TABLE II-continued

| Solid constituent | | G | G | I | J | J | J |
|---|---|---|---|---|---|---|---|
| Ti | ppm | 6 | 4 | 6 | 4 | 7 | 3 |
| Al | ppm | 160 | 100 | 115 | 77 | 82 | 53 |
| Cl | ppm | 117 | 74 | 100 | 48 | 86 | 39 |

EXAMPLE 8

40 mmol. of commercial magnesium diethoxide were suspended in a mixture of 40 ml toluene and 13.2 mmol. ethyl benzoate. Then, 40 ml liquid TiCl4 (363 mmol.) were added to the mixture at ambient temperature before heating to 80° C. for 2 hours. After filtration and washing once with toluene and five times with iso-octane at 70° C. there resulted a light brown solid comprising 4.4%w of Ti (constituent K).

1 g of constituent K was suspended in 40 ml 1,2-dichloroethane at 70° C. and stirred during 2 hours. The liquid phase was removed by decantation. The remaining white solid was washed once with 1,2-dichloroethane and 4 times with iso-octane at 70° C. and then stirred in 40 ml liquid TiCl4 (363 mmol.) at 80° C. during 2 hours. The liquid phase was removed by filtration and the resulting light brown solid was washed five times with iso-octane at 70° C. The solid product so obtained (constituent L) comprised 3.1%w Ti.

For comparison 1 g of constituent K was suspended in 40 ml liquid TiCl4 at 80° C. and the mixture was stirred during 2 hours at that temperature. After decanting and washing in the way indicated for constituent L there resulted a light brown solid (constituent M) comprising 3.6%w Ti.

EXAMPLE 9

30 mmol. of commercial magnesium diethoxide were suspended in a mixture of 30 ml toluene and 10 mmol. ethyl benzoate. Then, 45 ml liquid TiCl4 (408 mmol.) were added to the mixture at ambient temperature before heating to 80° C. for 2 hours. After filtration and washing five times with iso-octane at 70° C. the resulting solid was suspended in a solution of 8.5 g hexachloroethane (36 mmol.) in 75 ml iso-octane at 70° C. and stirred for 2 hours. The liquid phase was removed by filtration and the solid was washed five times with iso-octane at 70° C. Then, the solid was suspended in 50 ml liquid TiCl4 (454 mmol.) and the mixture was stirred at 80° C. for 2 hours. The solid was filtered off, washed five times with iso-octane at 70° C. The resulting light brown product (constituent N) comprised 3.3%w Ti.

EXAMPLE 10

80 mmol. of 2,6-di-tert.butyl-4-methyl phenol in 80 ml toluene were added to a stirred solution of 40 mmol. ethyl butyl magnesium in heptane (67 ml of a 0.6 mol./l solution). To this solution were added 13.4 mmol. ethyl benzoate. The resulting homogeneous solution was cooled to 0° C. and a solution of 30 ml TiCl4 (272 mmol.) in 100 ml toluene was added while stirring. 100 ml carbon tetrachloride (1040 mmol.) were added to the resulting deep-red suspension which was subsequently heated to 70° C. for one hour while stirring. The liquid phase was removed by filtration and the resulting brown solid was washed 4 times with iso-octane at 70° C. yielding a solid (constituent O) comprising 1.2%w Ti.

75% of the total amount of constituent O were suspended in 100 ml liquid TiCl₄ (908 mmol.) and stirred for 1 hour at 80° C. The resulting solid was isolated by decanting the liquid phase and washing 5 times with iso-octane at 70° C. The brown solid (constituent P) comprised 1.5%w Ti.

The polymerization activity of constituents K to P were determined under the standard polymerization test conditions except that for constituents K, L and M the polymerization runs were effected at a temperature of 70° C. and a pressure of 3100 kPa.

Table III lists the results of the polymerization tests.

TABLE III

| Solid constituent | | K* | L | M* | N | O* | P |
|---|---|---|---|---|---|---|---|
| Solid constituent | mg | 10 | 10 | 10 | 15 | 24 | 18 |
| Act | mmol. | 0.3 | 0.3 | 0.3 | 0.27 | 0.15 | 0.3 |
| ED | mmol. | 0.09 | 0.09 | 0.09 | 0.09 | — | 0.09 |
| Al/Ti | x | 33 | 46 | 40 | 26 | 25 | 28 |
| Time | hrs | 1 | 1 | 1 | 1 | 1 | 1 |
| Yield | kg/g cat. | 2.1 | 5.6 | 2.2 | 7.5 | <0.1 | 5.8 |
| Yield | kg/g Ti | 47 | 181 | 61 | 226 | — | 385 |
| XS | % w | 8.8 | 7.9 | 8.7 | 8.0 | — | 5.2 |
| Ti | ppm | 20 | 5 | 17 | 4 | — | 3 |
| Al | ppm | 370 | 120 | 380 | 59 | — | 71 |
| Cl | ppm | 200 | 75 | 250 | 60 | — | 58 |

*for comparison

What is claimed is:

1. Process for the polymerization of alpha-monoolefins which comprises contacting the monomers to be polymerized with a catalyst composition comprising an organoaluminum compound, a selectivity control agent, or an at least partial reaction product of those two components, and a titanium-containing catalyst component obtained by:
   i contacting with a halohydrocarbon in liquid phase a solid reaction product comprising a magnesium halide in which the atomic ratio of halogen to magnesium is at least 1.2:1, a titanium halide and an electron donor;
   ii optionally washing the resulting solid with an inert diluent to remove liquid remaining from the contacting step;
   iii contacting the resulting solid with a halide of tetravalent titanium in liquid phase; and
   iv washing the resulting solid with an inert diluent to remove residual unreacted titanium compound;
and recovering the resulting olefin polymer.

2. An olefin polymerization process according to claim 1 wherein the organoaluminum compound is a trialkylaluminum and said selectivity control agent and said electron donor are esters of aromatic carboxylic acids.

3. A process for the polymerization of propylene to isotactic polypropylene which comprises contacting propylene with a catalyst comprising a trialkylaluminum and a selectivity control agent or an at least partial reaction product of those two components, and a titanium-containing catalyst component obtained by:
   i contacting with a halohydrocarbon in liquid phase a solid reaction product comprising a magnesium halide in which the atomic ratio of halogen to magnesium is at least 1.2:1, a titanium halide and an electron donor;
   ii optionally washing the resulting solid with an inert diluent to remove liquid remaining from the contacting step;
   iii contacting the resulting solid with a halide of tetravalent titanium in liquid phase; and
   iv washing the resulting solid with an inert diluent to remove residual unreacted titanium compound;
and recovering polypropylene having a low inorganic ash content.

4. A process for the polymerization of propylene to isotactic polypropylene which comprises contacting propylene with a catalyst comprising a trialkylaluminum and a selectivity control agent or an at least partial reaction product of those two components, and a solid catalyst component containing titanium and magnesium in the atomic ratio of Ti:Mg in the range from 0.02:1 to 1.5:1, which is obtained by:
   i contacting with a chlorohydrocarbon in liquid phase a solid reaction product comprising a magnesium chloride in which the atomic ratio of chlorine to magnesium is at least 1.5:1, a titanium chloride and, as electron donor, an ether, ester, amine, phenol or phosphine, present in a ratio of 0.01 to 5 mole of said electron donor per atom of magnesium;
   ii optionally washing the resulting solid with an inert diluent to remove liquid remaining from the contacting step;
   iii contacting the resulting solid with a chloride of tetravalent titanium in liquid phase; and
   iv washing the resulting solid with an inert diluent to remove residual unreacted titanium compound;
and recovering polypropylene having a low inorganic ash content.

5. A process according to claim 4 wherein said selectivity control agent and said electron donor are esters of aromatic carboxylic acids and said titanium chloride and said chloride of tetravalent titanium are titanium tetrachloride.

6. A process for the polymerization of propylene to isotactic polypropylene which comprises contacting propylene with a catalyst comprising a trialkylaluminum and a selectivity control agent or an at least partial reaction product of those two components, and a solid catalyst component containing titanium and magnesium in an atomic ratio of Ti:Mg in the range from 0.02:1 to 1:1, which is obtained by:
   i contacting with a chlorohydrocarbon in liquid phase a solid reaction product comprising magnesium dichloride, titanium tetrachloride and, as electron donor, an ester of an aromatic carboxylic acid present in a ratio of 0.01 to 5 moles of said ester per atom of magnesium;
   ii optionally washing the resulting solid with an inert diluent to remove liquid remaining from the contacting step;
   iii contacting the resulting solid with titanium tetrachloride in liquid phase; and
   iv washing the resulting solid with an inert diluent to remove residual unreacted titanium compound;
and recovering polypropylene having a low ash content.

7. A process according to claim 6 wherein said selectivity control agent is p-ethyl anisate and said electron donor is ethyl benzoate.

8. A process according to claims 2 or 3 in which said magnesium halide is magnesium dichloride and said titanium halide is titanium tetrachloride.

9. Process for the polymerization of alpha-monoolefins which comprises contacting the monomers to be polymerized with a catalyst composition comprising an organoaluminum compound, a selectivity control agent, or an at least partial reaction product of those two components, and a titanium-containing catalyst component obtained by:
i contacting with a halohydrocarbon in liquid phase a solid reaction product of a magnesium dialkoxide, diaryloxide or dialkyl with titanium tetrachloride and an electron donor, said reaction product comprising magnesium chloride in which the atomic ratio of chlorine to magnesium is at least 1.5:1, titanium chloride and electron donor;
ii optionally washing the resulting solid with an inert diluent to remove liquid remaining from the contacting step;
iii contacting the resulting solid with titanium tetrachloride in liquid phase; and
iv washing the resulting solid with an inert diluent to remove residual unreacted titanium compound;
and recovering the resulting olefin polymer.

10. An olefin polymerization process according to claim 9 wherein the organoaluminum compound is trialkylaluminum and said selectivity control agent and said electron donor are esters of aromatic carboxylic acids.

11. A process for the polymerization of propylene to isotactic polypropylene which comprises contacting propylene with a catalyst comprising a trialkylaluminum and a selectivity control agent or an at least partial reaction product of those two components, and a titanium-containing catalyst component obtained by:
i contacting with a halohydrocarbon in liquid phase a solid reaction product of a magnesium dialkoxide, diaryloxide or dialkyl with titanium tetrachloride and an electron donor, said reaction product comprising magnesium chloride in which the atomic ratio of chlorine to magnesium is at least 1.5:1, titanium chloride and electron donor;
ii optionally washing the resulting solid with an inert diluent to remove liquid remaining from the contacting step;
iii contacting the resulting solid with a chloride of tetravalent titanium in liquid phase; and
iv washing the resulting solid with an inert diluent to remove residual unreacted titanium compound;
and recovering polypropylene having a low inorganic ash content.

12. A process for the polymerization of propylene to isotactic polypropylene which comprises contacting propylene with a catalyst comprising a trialkylaluminum and a selectivity control agent or an at least partial reaction product of those two components, and a solid catalyst component containing titanium and magnesium in an atomic ratio of Ti:Mg in the range from 0.02:1 to 1:1, which is obtained by:
i contacting with a chlorohydrocarbon in liquid phase a solid reaction product of a magnesium dialkoxide or diaryloxide with titanium tetrachloride and an ester of an aromatic carboxylic acid as electron donor, said reaction product comprising magnesium dichloride, titanium tetrachloride and said ester present in a ratio of 0.01 to 5 moles of said ester per atom of magnesium;
ii optionally washing the resulting solid with an inert diluent to remove liquid remaining from the contacting step;
iii contacting the resulting solid with titanium tetrachloride in liquid phase; and
iv washing the resulting solid with an inert diluent to remove residual unreacted titanium compound;
and recovering polypropylene having a low ash content.

13. A process for the polymerization of propylene to isotactic polypropylene which comprises contacting propylene with a catalyst comprising a trialkylaluminum and a selectivity control agent or an at least partial reaction product of those two components, and a solid catalyst component containing titanium and magnesium in an atomic ratio of Ti:Mg in the range from 0.02:1 to 1:1, which is obtained by:
i contacting with a chlorohydrocarbon in liquid phase a solid reaction product of a dialkyl magnesium compound with titanium tetrachloride and an ester of an aromatic carboxylic acid as electron donor, said reaction product comprising magnesium dichloride, titanium tetrachloride and said ester present in a ratio of 0.01 to 5 moles of said ester per atom of magnesium;
ii optionally washing the resulting solid with an inert diluent to remove liquid remaining from the contacting step;
iii contacting the resulting solid with titanium tetrachloride in liquid phase; and
iv washing the resulting solid with an inert diluent to remove residual unreacted titanium compound;
and recovering polypropylene having a low ash content.

14. A process according to claim 12 wherein said selectivity control agent is p-ethyl anisate and said electron donor is ethyl benzoate.

15. A process according to claim 13 wherein said selectivity control agent is p-ethyl anisate and said electron donor is ethyl benzoate.

16. A process according to claims 4, 5, 6, 7, 12, 13, 14 or 15 wherein said chlorohydrocarbon is an aliphatic chlorohydrocarbon which has at least two chlorine atoms per molecule.

17. A process according to claims 4, 5, 6, 7, 12, 13, 14 or 15 wherein said chlorohydrocarbon is carbon tetrachloride.

18. A process according to claims 4, 5, 6, 7, 12, 13, 14 or 15 wherein said chlorohydrocarbon is chlorobenzene.

19. An olefin polymerization process according to claims 2, 5, 6, 12 or 13 wherein said trialkyl aluminum is triethylaluminum and said selectivity control agent is p-ethyl anisate, and the atomic ratio of aluminum to titanium in the total catalyst is not in excess of 100:1.

20. An olefin polymerization process according to claim 19 in which the atomic ratio of aluminum to titanium in the total catalyst is not in excess of 50:1.

21. A propylene polymerization process according to claims 5, 6 7, 12 or 13 wherein propylene is contacted with said catalyst in a liquid reaction mixture which initially consists essentially of propylene as sole reaction diluent, said catalyst and, optionally, hydrogen.

* * * * *

UNITED STATES PATENT AND TRADEMARK OFFICE
CERTIFICATE OF CORRECTION

PATENT NO. : 4,393,182
DATED : July 12, 1983
INVENTOR(S) : Brian L. Goodall, Adrianus A. van der Nat and Willem Sjardijn It is certified that error appears in the above-identified patent and that said Letters Patent are hereby corrected as shown below:

On the Title Page, Foreign Application Priority Data, the date of priority reading May 17, 1979 should read April 30, 1979.

Signed and Sealed this

Twenty-fourth Day of September 1985

[SEAL]

Attest:

DONALD J. QUIGG

Attesting Officer

Commissioner of Patents and Trademarks—Designate